Patented Feb. 17, 1953

2,628,982

UNITED STATES PATENT OFFICE 2,628,982

BIS(TRICHLORMETHYL) SULFONE

William R. James, Marblehead, Mass., assignor to Monsanto Chemical Company, St. Louis, Mo., a corporation of Delaware No Drawing. Application March 31, 1951, Serial No. 218,708

9 Claims. (Cl. 260—607)

1

The present invention relates to a new chemical compound and to a process of preparing such compound.

It is one object of this invention to provide a new chemical compound, namely bis-(trichlormethyl) sulfone.

It is a further object of this invention to provide a process for preparing bis-(trichlormethyl) sulfone.

Still further objects and advantages of this invention will appear in the following description and appended claims.

The new chemical compound bis-(trichlormethyl) sulfone, having the structural formula

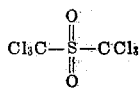

is prepared, in general, in accordance with the present invention by reacting thiodiglycolic acid (also known as thio-bis acetic acid) or its water-soluble salts as, for example, its alkali metal salts, with an alkali metal hypochlorite such as sodium hypochlorite in an aqueous solution under neutral to alkaline conditions. The bis-(trichlormethyl) sulfone separates from the solution as an oily liquid or as a solid depending on whether the solution is maintained at a temperature above or below the melting point of the sulfone. When the sulfone separates from the solution as an oily liquid, the solution may be cooled after the reaction, in which case the sulfone crystallizes from the oily layer, after which the crystallized sulfone is separated from the liquid phase by filtration, decantation, centrifuging or the like. When the sulfone initially separates from the solution as a solid these same procedures of filtration, etc. may be used to recover the sulfone from the liquid phase. The sulfone is substantially free of impurities when recovered as described above, but may be further purified if desired. Such further purification is suitably accomplished, for example, by vacuum distillation of the recovered product.

In carrying out the reaction described above, it is possible to add the thiodiglycolic acid or its water-soluble salts or an aqueous solution of such acid and/or its water-soluble salts to an aqueous solution of the alkali metal hypochlorite, which last-mentioned solution is preferably at a pH of about 7 to 13. Additional quantities of the acid or its water-soluble salts or additional quantities of the alkali metal hypochlorite solution may be added, as required, to carry out the reaction to the desired extent, that is, to the stage at which bis-(trichlormethyl) sulfone is formed.

It is also possible to add an aqueous solution of alkali metal hypochlorite, which has preferably been adjusted to a pH of about 7 to 13 to an aqueous solution of thiodiglycolic acid or its water-soluble salts. All of such hypochlorite solution may be added at one time or portions of the total hypochlorite solution required may be added. Suitable results are generally obtained when portions of the total amount of hypochlorite solution required are added in a plurality of addition steps, preferably 2 to 6 addition steps, and the solution is adjusted between substantially the neutral point and a pH of about 8 after the added hypochlorite solution has been allowed to react. Such neutralization of the solution is suitably carried out by means of hydrochloric acid or with some other inorganic acid. Organic acids may also be used in some instances, but they are decidedly inferior to inorganic acids for this purpose.

During the addition of the alkali metal hypochlorite solution to the solution of the alkali metal thiodiglycolate the pH of the solution usually increases especially if the hypochlorite solution is alkaline. For this reason the alkali metal hypochlorite is usually added stepwise and the solution is adjusted to a pH between substantially the neutral point and a pH of 8 with an acid, as hereinbefore described, because this decreases the possibility of hydrolyzing the sulfone formed in the solution.

The amount of alkali metal hypochlorite used in relation to the amount of thiodiglycolic acid or its water-soluble salts employed may be varied considerably. However, it is usually necessary to employ at least 4 mols of the hypochlorite for each mol of the acid or its water-soluble salt. In most instances satisfactory results are obtained by using from about 4 to 10 mols of alkali metal hypochlorite for each mol of thiodiglycolic acid or its salt. Best results are obtained under most conditions of operation by using from about 7 to 9 mols of the hypochlorite for each mol of the acid or its salt and these proportions are accordingly preferred.

The reaction between the alkali metal hypochlorite and the thiodiglycolic acid or its water-soluble salts may be carried out at various temperatures. In general, satisfactory results have been obtained at temperatures ranging from just above the freezing point of an aqueous solution of the reactants to about 45° C. Somewhat higher temperatures may be used but since the reaction proceeds satisfactorily at room temperature, that is, between about 20 and 30° C., it is not necessary to heat or cool the solution with the exception that cooling is sometimes required in the initial stages of the reaction for proper control of the reaction.

The duration of the reaction between the thiodiglycolic acid or its water-soluble salts and the alkali metal hypochlorite to form bis-(trichlormethyl) sulfone will vary to some extent depending primarily on the rate at which the reactants are brought into contact with each other. Essentially the reaction is quite rapid and may be completed within about 2 to 10 minutes after the reactants have been brought in contact with each other. Of course the reactants may be allowed to stand after the actual reaction is complete and the total time required to carry out the entire process may be varied considerably, depending, for example, on the time used to make the various additions of the solutions and the time required to make the pH adjustments.

Bis-(trichlormethyl) sulfone is a white, crystalline solid which is toxic to tribolium and which is also toxic, on residue, to milkweed bugs. Thus, it may be used in insecticidal compositions employed against either of these insects. It also is a herbicide with respect to grasses and may be used for the extermination of this type of plant life. Bis-(trichlormethyl) sulfone has a low melting point and when liquefied by heating it to a temperature of about 35 to 40° C. or higher is useful as a solvent for a variety of liquid and solid organic compounds.

A further understanding of the compound and processes of this invention will be obtained from the following specific examples which are intended to illustrate the invention but are not intended to limit the scope thereof.

Example I

An aqueous solution containing about 0.4 mol of disodium thiodiglycolate, prepared by reacting 0.45 mol of sodium sulfide and 0.8 mol of sodium monochloracetate in an aqueous solution at room temperature for 3 hours, was acidified with sulfuric acid, after which nitrogen gas was bubbled through the solution to remove hydrogen sulfide. The solution was filtered to remove free sulfur and the excess acid in the solution was then neutralized with sodium carbonate.

Nine hundred and twenty-five cubic centimeters of commercial sodium hypochlorite solution (containing 12.3% of available chlorine by volume), which solution had been neutralized to a pH of 9.5 with hydrochloric acid, were added to the solution, prepared as described immediately above, with stirring. The temperature of the solution was maintained at about 40° C. by external cooling. After about 10 minutes, the resulting solution, which had a pH of about 12, was neutralized with hydrochloric acid to a pH of about 7. A second charge consisting of 460 cubic centimeters of the same sodium hypochlorite solution, as described above, were then added, and after about 10 minutes the pH of the solution, which had increased to about 12, was adjusted to about 7 with hydrochloric acid. A third charge consisting of 460 cubic centimeters of the same sodium hypochlorite solution as that initially used was next added to the solution with stirring. At this stage the solution gave a positive reaction to starch-potassium iodide paper. The total amount of sodium hypochlorite thus added corresponded to about 3.2 mols of available chlorine after all of the hypochlorite solution had been added. The solution was adjusted to a pH of 8.2 with hydrochloric acid and was then allowed to stand for 2 hours during which time an oily layer collected below the aqueous solution. The entire mixture was then cooled to about 25° C. and allowed to stand until substantially all of the only layer had crystallized, after which the crystallized product was separated from the liquid constituents by filtration. The product was purified by vacuum distillation and was found to boil at 76.5 to 78° C. at 0.2 mm. of pressure and melted at 33 to 36.5° C.

An analysis of the distilled product showed that it contained 7.96% carbon; 10.59% sulfur; 70.73% chlorine; no hydrogen; and 10.72% oxygen by difference. The theoretical composition of bis-(trichlormethyl) sulfone is as follows: 7.97% carbon; 10.65% sulfur; 70.9% chlorine and 10.48% oxygen. The yield of crude product, calculated as bis-(trichlormethyl) sulfone from the sodium monochloracetate used was about 62%.

Example II

Two hundred and thirty cubic centimeters of an aqueous solution of sodium hypochlorite, adjusted to a pH of 9.5 with hydrochloric acid and containing 12.5% of available chlorine by volume were added with stirring to an aqueous solution containing 0.1 mol of disodium thiodiglycolate and maintained at a temperature between −2 and +1° C. A white solid separated from solution within a period of 5 to 15 minutes. This solid was immediately separated from the liquid phase by filtration. Analysis showed that the product was bis-(trichlormethyl) sulfone contaminated with sodium sulfate. The yield of crude bis-(trichlormethyl) sulfone was about 32%, based on the starting disodium thiodiglycolate.

Example III

An aqueous solution containing about 0.33 mol of thiodiglycolic acid was neutralized to a pH of 7 with sodium carbonate to prepare a sodium salt of the acid.

Eight hundred cubic centimeters of commercial sodium hypochlorite solution containing 12.3% of available chlorine by volume and a small amount of free sodium hydroxide sufficient to give the solution a pH about 12 were added with stirring to the aqueous solution of sodium thiodiglycolate prepared as described in the paragraph immediately above. The temperature was maintained at about 40° C. After about 5 minutes, the solution, which was highly alkaline, was adjusted to a pH between 6 and 7 with hydrochloric acid and 365 cubic centimeters of the same commerical sodium hypochlorite solution, as employed immediately above, were added. The temperature of the solution was maintained at about 40° C. during this addition. The pH of the solution increased after the sodium hypochlorite addition. The pH of the solution was adjusted to about 6 to 7 with hydrochloric acid and a third charge of 365 cubic centimeters of the same commercial sodium hypochlorite solution was added with stirring while maintaining the temperature of the solution at 40° C. The pH of the solution again increased. This solution, which contained a definite excess of hypochlorite, was allowed to stand for 16 hours at 25° C. A white solid separated from the aqueous phase and this solid was separated from the liquid constituents by filtration. After the solid was purified by vacuum distillation it had a melting point of 33 to 36.5° C.

and boiled at about 76.5 to 78° C. at 0.2 mm. of pressure. An analysis showed that the product was bis-(trichlormethyl) sulfone. The yield was 25% based on the starting thiodiglycolic acid.

*Example IV*

Bis-(trichlormethyl) sulfone was prepared using the same procedure and reactants described in Example III with the exception that the commercial sodium hypochlorite solution was adjusted to a pH of 7.5 with hydrochloric acid prior to its use.

The product was the same as obtained in Example I, that is, it had the same melting point and chemical composition. However, in this experiment the yield of bis-(trichlormethyl) sulfone was 80%, based on the starting disodium thioglycolate.

Various changes and modifications may be made in the processes described herein as will be apparent to those skilled in the art to which this invention appertains without departing from the intent and spirit of this invention. It is accordingly intended that the present invention shall only be limited by the scope of the appended claims.

What is claimed is:

1. Bis-(trichlormethyl) sulfone.

2. A process which comprises reacting an alkali metal hypochlorite and a substance selected from the group consisting of thiodiglycolic acid, water-soluble salts of thiodiglycolic acid and mixtures thereof in an aqueous solution under substantially neutral to alkaline conditions until bis-(trichlormethyl) sulfone is formed.

3. A process which comprises reacting an alkali metal hypochlorite and a substance selected from the group consisting of thiodiglycolic acid, water-soluble salts of thiodiglycolic acid and mixtures thereof in an aqueous solution under substantially neutral to alkaline conditions until bis-(trichlormethyl) sulfone is formed, said hypochlorite being employed in an amount sufficient to provide at least 4 mols of hypochlorite for each mol of said substance.

4. A process which comprises reacting an alkali metal hypochlorite and a substance selected from the group consisting of thiodiglycolic acid, water-soluble salts of thiodiglycolic acid and mixtures thereof in an aqueous solution under substantially neutral to alkaline conditions and at a temperature ranging from just above the freezing point of the solution to about 45° C., said hypochlorite being employed in an amount sufficient to provide at least 4 mols of hypochlorite for each mol of said substance, and continuing the reaction until bis-(trichlormethyl) sulfone is formed.

5. A process which comprises reacting about 4 to 10 mols of metal hypochlorite with 1 mol of a substance selected from the group consisting of thiodiglycolic acid, water-soluble salts of thiodiglycolic acid and mixtures thereof in an aqueous solution under substantially neutral to alkaline conditions and at a temperature ranging from just above the freezing point of the solution to about 45° C. until bis-(trichlormethyl) sulfone is formed.

6. A process according to claim 5, but further characterized in that the alkali metal hypochlorite is sodium hypochlorite and said substance is thiodiglycolic acid.

7. A process according to claim 5, but further characterized in that the alkali metal hypochlorite is sodium hypochlorite and said substance is a sodium salt of thiodiglycolic acid.

8. A process according to claim 5, but further characterized in that the alkali metal hypochlorite is sodium hypochlorite and said substance is the disodium salt of thiodiglycolic acid.

9. A process which comprises adding an aqueous solution of an alkali metal hypochlorite to an aqueous solution of an alkali metal salt of thiodiglycolic acid, said solution of hypochlorite being added in a plurality of steps and in a total amount sufficient to provide at least 4 mols of hypochlorite for each mol of said salt, allowing the solution after each addition of said hypochlorite solution to become alkaline and then adjusting the pH of the solution until it is substantially neutral, and continuing the aforementioned operations until bis-(trichlormethyl) sulfone is formed.

WILLIAM R. JAMES.

REFERENCES CITED

The following references are of record in the file of this patent:

UNITED STATES PATENTS

| Number | Name | Date |
|---|---|---|
| 2,127,400 | Gibbs | Aug. 16, 1938 |
| 2,484,489 | Craig et al. | Oct. 11, 1949 |